US012592252B2

(12) United States Patent
Ma et al.

(10) Patent No.: US 12,592,252 B2
(45) Date of Patent: Mar. 31, 2026

(54) HARD DISK DRIVES WITH PIEZOELECTRIC ULTRASONIC MOTOR

(71) Applicant: SEAGATE TECHNOLOGY LLC, Fremont, CA (US)

(72) Inventors: Yichao Ma, Singapore (SG); Xiong Liu, Singapore (SG); Barish Chakravarty, Singapore (SG)

(73) Assignee: Seagate Technology LLC, Fremont, CA (US)

( * ) Notice: Subject to any disclaimer, the term of this patent is extended or adjusted under 35 U.S.C. 154(b) by 44 days.

(21) Appl. No.: 18/738,316

(22) Filed: Jun. 10, 2024

(65) Prior Publication Data

US 2024/0412762 A1 Dec. 12, 2024

Related U.S. Application Data

(60) Provisional application No. 63/472,506, filed on Jun. 12, 2023.

(51) Int. Cl.
| | |
|---|---|
| *G11B 5/55* | (2006.01) |
| *G11B 5/48* | (2006.01) |
| *G11B 21/08* | (2006.01) |
| *G11B 21/12* | (2006.01) |

(52) U.S. Cl.
CPC .......... *G11B 5/5521* (2013.01); *G11B 5/4813* (2013.01); *G11B 5/4873* (2013.01); *G11B 5/5578* (2013.01); *G11B 21/08* (2013.01); *G11B 21/12* (2013.01)

(58) Field of Classification Search
None
See application file for complete search history.

(56) References Cited

U.S. PATENT DOCUMENTS

| | | | |
|---|---|---|---|
| 4,034,613 | A | 7/1977 | Halfhill et al. |
| 4,189,759 | A | 2/1980 | Bauck et al. |
| 4,287,445 | A | 9/1981 | Lienau |
| 4,322,840 | A | 3/1982 | Kusaka |
| 4,376,294 | A | 3/1983 | Meier et al. |
| 4,392,165 | A | 7/1983 | Wright |
| 4,545,046 | A | 10/1985 | Jansen et al. |
| 4,613,962 | A | 9/1986 | Inoue et al. |
| 4,631,611 | A | 12/1986 | Schneider |
| 4,663,682 | A | 5/1987 | McNeil |
| 4,672,490 | A | 6/1987 | Shigenai et al. |
| 4,703,375 | A | 10/1987 | Chan et al. |
| 4,742,410 | A | 5/1988 | Smith |
| 4,745,503 | A | 5/1988 | Muraoka et al. |
| 4,763,314 | A | 8/1988 | McCaslin et al. |
| 4,764,829 | A | 8/1988 | Makino |

(Continued)

OTHER PUBLICATIONS

Carter et al., "Introduction to Piezoelectric Transducers," Piezo.com (https://piezo.com/pages/intro-to-piezoelectricity), (72 pages), 2019.

*Primary Examiner* — Craig A. Renner
(74) *Attorney, Agent, or Firm* — Faegre Drinker Biddle & REATH LLP

(57) ABSTRACT

An apparatus includes a linear actuator assembly with a rail, a carriage, and a piezoelectric actuator. The carriage is coupled to the rail such that the carriage is movable with respect to the rail, and the piezoelectric actuator is configured and arranged to cause the carriage to move linearly between ends of the rail.

19 Claims, 8 Drawing Sheets

(56)　　　　　References Cited

U.S. PATENT DOCUMENTS

| | | | |
|---|---|---|---|
| 4,792,707 A | 12/1988 | Katanuma | |
| 4,800,818 A | 1/1989 | Kawaguchi et al. | |
| 4,819,108 A | 4/1989 | Seki et al. | |
| 4,888,751 A | 12/1989 | Yoshimaru et al. | |
| 4,902,971 A | 2/1990 | Guzik et al. | |
| 4,937,692 A | 6/1990 | Okutsu | |
| 4,974,104 A | 11/1990 | Ferguson et al. | |
| 5,007,712 A | 4/1991 | Kikuchi et al. | |
| 5,016,238 A | 5/1991 | Shtipelman et al. | |
| 5,029,030 A | 7/1991 | Luecke | |
| 5,043,964 A | 8/1991 | Suzuki | |
| 5,189,578 A * | 2/1993 | Mori et al. | G11B 21/08 360/98.01 |
| 5,229,901 A | 7/1993 | Mallary | |
| 5,317,552 A | 5/1994 | Yamasaki | |
| 5,396,384 A * | 3/1995 | Caldeira et al. | G11B 33/122 360/98.01 |
| 5,396,385 A | 3/1995 | Tangi et al. | |
| 5,467,238 A | 11/1995 | Lee et al. | |
| 5,493,463 A | 2/1996 | Hagen | |
| 5,521,778 A | 5/1996 | Boutaghou et al. | |
| 5,682,076 A * | 10/1997 | Zumeris | G11B 7/08576 360/294.4 |
| 5,801,531 A | 9/1998 | Viches et al. | |
| 5,825,180 A | 10/1998 | Guzik | |
| 5,875,166 A | 2/1999 | Ikegame et al. | |
| 5,968,627 A | 10/1999 | Nigam et al. | |
| 6,043,957 A | 3/2000 | Hattori et al. | |
| 6,064,550 A | 5/2000 | Koganezawa | |
| 6,157,521 A | 12/2000 | Utsunomiya | |
| 6,310,750 B1 | 10/2001 | Hawwa et al. | |
| 6,344,950 B1 | 2/2002 | Watson et al. | |
| 6,356,640 B1 | 3/2002 | Lin | |
| 6,362,933 B1 | 3/2002 | Sampietro et al. | |
| 6,369,988 B1 | 4/2002 | Yoshida et al. | |
| 6,480,361 B1 | 11/2002 | Patterson | |
| 6,549,377 B2 | 4/2003 | Yoshida et al. | |
| 6,765,744 B2 | 7/2004 | Gomez et al. | |
| 6,987,637 B2 | 1/2006 | Litvinov et al. | |
| 7,027,147 B2 | 4/2006 | Steenhoek et al. | |
| 7,072,147 B2 | 7/2006 | Limmer et al. | |
| 7,199,981 B2 | 4/2007 | Zabtcioglu | |
| 7,372,671 B2 | 5/2008 | Yazawa | |
| 7,375,930 B2 | 5/2008 | Yang et al. | |
| 7,492,542 B2 | 2/2009 | van Zyl | |
| 7,652,847 B2 | 1/2010 | Weiss et al. | |
| 7,672,083 B1 | 3/2010 | Yu et al. | |
| 7,710,683 B2 | 5/2010 | Craig et al. | |
| 8,958,172 B1 | 2/2015 | Hansen | |
| 8,958,173 B1 | 2/2015 | Hirano et al. | |
| 9,218,833 B1 | 12/2015 | Shah et al. | |
| 9,361,919 B1 | 6/2016 | Lieu et al. | |
| 10,192,575 B1 | 1/2019 | Resh | |
| 10,249,339 B1 | 4/2019 | Mendonsa et al. | |
| 10,269,380 B1 | 4/2019 | Sun et al. | |
| 10,431,246 B2 | 10/2019 | Zhu et al. | |
| 10,510,373 B1 | 12/2019 | Granz et al. | |
| 10,622,012 B1 | 4/2020 | Tu et al. | |
| 10,699,730 B1 | 6/2020 | Uefune et al. | |
| 10,706,879 B2 | 7/2020 | Garbarino | |
| 10,803,891 B1 | 10/2020 | Jacoby et al. | |
| 10,818,317 B1 | 10/2020 | Erden et al. | |
| 10,978,100 B1 | 4/2021 | Myers | |
| 11,037,590 B2 | 6/2021 | Nguyen et al. | |
| 11,062,734 B1 | 7/2021 | Brand | |
| 11,120,834 B1 | 9/2021 | Herdendorf et al. | |
| 11,176,963 B1 * | 11/2021 | Herdendorf et al. | G11B 5/5521 |
| 11,348,611 B1 * | 5/2022 | Mendonsa et al. | G11B 21/12 |
| 11,361,787 B1 | 6/2022 | Mendonsa et al. | |
| 11,468,909 B1 | 10/2022 | Liang et al. | |
| 11,727,957 B1 * | 8/2023 | Ma et al. | G11B 5/4873 360/98.01 |
| 11,948,612 B2 | 4/2024 | Mendonsa et al. | |
| 2004/0008609 A1 | 1/2004 | Fujibayashi et al. | |
| 2004/0087253 A1 | 5/2004 | Mahadev et al. | |
| 2004/0130320 A1 | 7/2004 | Guzik et al. | |
| 2004/0179465 A1 | 9/2004 | Kuwajima et al. | |
| 2004/0257710 A1 | 12/2004 | Limmer et al. | |
| 2005/0225875 A1 | 10/2005 | Wada et al. | |
| 2005/0280945 A1 | 12/2005 | Duvall et al. | |
| 2007/0279804 A1 | 12/2007 | White | |
| 2008/0084636 A1 | 4/2008 | Oh et al. | |
| 2010/0246068 A1 | 9/2010 | Lee | |
| 2011/0038074 A1 | 2/2011 | Viskochil et al. | |
| 2012/0206830 A1 | 8/2012 | Gao et al. | |
| 2016/0171993 A1 | 6/2016 | Okubo | |
| 2018/0301162 A1 | 10/2018 | Erden | |
| 2020/0027480 A1 | 1/2020 | Myers et al. | |
| 2020/0202891 A1 | 6/2020 | Mendonsa et al. | |
| 2020/0227077 A1 | 7/2020 | Sukla et al. | |
| 2021/0312945 A1 | 10/2021 | Mendonsa et al. | |
| 2022/0319544 A1 * | 10/2022 | Subramanian et al. | G11B 5/5521 |
| 2023/0005502 A1 * | 1/2023 | Mendonsa et al. | G11B 21/12 |
| 2023/0260547 A1 * | 8/2023 | Liu et al. | G11B 21/12 360/77.02 |
| 2024/0005952 A1 * | 1/2024 | Mendonsa et al. | G11B 5/5578 |

* cited by examiner

HARD DISK DRIVES WITH PIEZOELECTRIC ULTRASONIC MOTOR

RELATED APPLICATIONS

This application claims priority to U.S. Provisional Patent Application No. 63/472,506, filed on Jun. 12, 2023, incorporated by reference herein for all purposes.

SUMMARY

In certain embodiments, a hard disk drive includes a magnetic recording medium, a first magnetic sensor, and a first actuator assembly configured to linearly move the first magnetic sensor to different positions with respect to the magnetic recording medium. The first actuator assembly includes a first linear bearing with a first movable portion and a first stationary portion. The first actuator assembly also includes a first piezoelectric actuator configured to move the first movable portion to cause movement of the first magnetic sensor.

In certain embodiments, an apparatus includes a linear actuator assembly with a rail, a carriage, and a piezoelectric actuator. The carriage is coupled to the rail such that the carriage is movable with respect to the rail, and the piezoelectric actuator is configured and arranged to cause the carriage to move linearly between ends of the rail.

While multiple embodiments are disclosed, still other embodiments of the present invention will become apparent to those skilled in the art from the following detailed description, which shows and describes illustrative embodiments of the invention. Accordingly, the drawings and detailed description are to be regarded as illustrative in nature and not restrictive.

Figure 1:
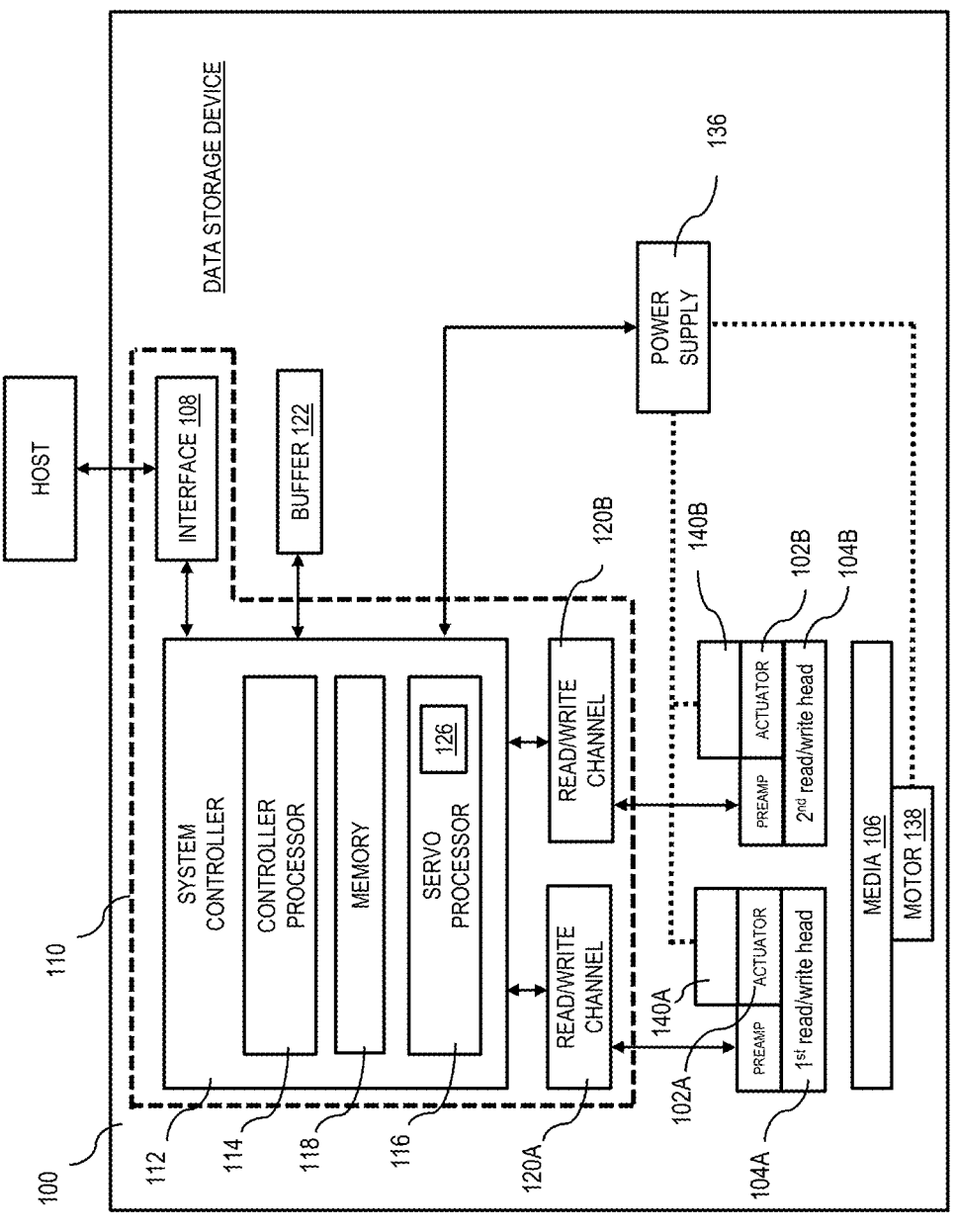
FIG. 1 shows a block diagram of a hard disk drive, in accordance with certain embodiments of the present disclosure.

While the disclosure is amenable to various modifications and alternative forms, specific embodiments have been shown by way of example in the drawings and are described in detail below. The intention, however, is not to limit the disclosure to the particular embodiments described but instead is intended to cover all modifications, equivalents, and alternatives falling within the scope of the appended claims.

DETAILED DESCRIPTION

Historically, hard disk drives have used a single rotatable actuator assembly to move read/write heads to a desired location to record or access data. Recently, certain types of hard disk drives have added a second rotatable actuator assembly to increase overall data transfer rate capabilities of the hard disk drives. However, these dual-actuator designs require the diameter of the magnetic recording medium to be reduced (e.g., from 97 mm in a single-actuator design to 84 mm in a dual-actuator design), which reduces the overall storage capacity of the hard disk drive.

Certain embodiments of the present disclosure are directed to designs that utilize two actuator assemblies and that allow for larger diameter magnetic recording media to be used compared to prior designs.

FIG. 1 shows a schematic of a data storage device 100 such as a hard disk drive. In the case of a hard disk drive, the data storage device 100 can include multiple actuators (i.e., a first actuator 102A and a second actuator 102B) each with one or more read/write heads 104A and 104B to provide concurrent access to magnetic recording media 106 (e.g., magnetic recording disks, which are referred to as a magnetic recording medium in singular form). In some embodiments, the multiple actuators 102A and 102B have separate pivot axes. In such embodiments, the read/write head(s) 104A coupled to the first actuator 102A can access the same magnetic recording medium 106 as the read/write head(s) 104B coupled to the second actuator 102B. Although only two actuators for the data storage device 100 are shown in FIG. 1, additional actuators can be incorporated into the data storage device 100 or the data storage device 100 may have only one actuator. The read/write heads 104A and 104B can include a magnetic sensor (e.g., the read head) and a magnetic writer (e.g., the write head).

The data storage device 100 includes an interface 108 (e.g., an input/output interface) for transferring data to and from the data storage device 100. For example, the interface 108, among other features, can be communicatively coupled between a host (e.g., a laptop or a data storage system such as a server) and the read/write heads 104A and 104B to facilitate communication, using a standardized communication protocol (e.g., SATA, SAS, SCSI), between the read/write heads 104A and 104B and the host.

The data storage device 100 can include a system on a chip ("SOC") 110 (shown in dashed lines) that includes a system controller 112, which can include a controller processor 114 (e.g., a microprocessor), a servo processor 116 (e.g., a microprocessor), and memory 118 coupled to the controller processor 114 and the servo processor 116. The SOC 110 can include multiple distinct banks of memory. For example, one bank of memory 118 can be dedicated to the controller processor 114 and its functions while another bank of memory 118 can be dedicated to the servo processor 116 and its functions (e.g., the memory 118 and the servo processor 116 together functioning as a servo controller). The interface 108 may also be part of the SOC 110.

The SOC 110 can also include one or more read/write channels 120A and 120B, which encode data associated with write commands and with read commands. The SOC 110 may be an integrated circuit such as an application-specific integrated circuit ("ASIC") and field-programmable gate array ("FPGA") that includes instructions (e.g., in the form of firmware) for carrying out various functions of the data storage device 100. For example, the SOC 110 can include circuitry to control and carry out various aspects of the data storage device 100 as described in more detail below. Although the interface 108, system controller 112, etc., are shown as being part of a single SOC, the components and their functions can be distributed among several integrated circuits. The system controller 112 can be coupled to and control access to a buffer 122, which can temporarily store data associated with read commands and write commands. The buffer 122 can be a volatile memory, such as a dynamic random access memory ("DRAM"), static random access memory ("SRAM"), or other volatile memory.

During operation, the data storage device 100 receives various data transfer commands (e.g., a read command or a write command) from the host. Data associated with a write command may be received from the host by the interface 108 and initially stored to the buffer 122. The data is encoded or otherwise processed by respective read/write channels 120A or 120B and eventually stored to the magnetic recording media 106 via one of the read/write heads 104A or 104B coupled to the respective first actuator 102A or the second actuator 102B. Data associated with a read command may be retrieved from the magnetic recording media 106 and stored in the buffer 122. Such data is then transferred to the host by the interface 108.

The data storage device 100 includes a servo control system 126 that is carried out by components of the system controller 112 (e.g., the servo processor 116 and one or more banks of the memory 118).

As shown in FIG. 1, the data storage device 100 includes one or more power supplies 136, (e.g., one or more amplifiers) which are controlled by the system controller 112. The one or more power supplies 136 supply power to a motor 138 (e.g., spindle motor), which rotates the magnetic recording media 106.

The one or more power supplies 136 also supply power to actuator assemblies 140A and 140B. In certain embodiments, the power supply 136 is an integrated circuit, which includes electronics (e.g., piezoelectric motor driver electronics) designed to provide power to certain components of the actuator assemblies 140A and 140B.

The actuator assemblies 140A and 140B are used to position (e.g., linearly move) the actuators 102A and 102B to position the read/write heads 104A and 104B over a desired data track on the magnetic recording media 106 for data reading and data writing operations. For example, in response to a command to read data from or write data to a data track located a certain distance away from where a respective read/write head 104A or 104B is currently positioned, a current or voltage may be supplied by the power supply 136 and applied to piezoelectric actuators or motors of the actuator assemblies 140A and 140B to linearly move the respective actuators 102A and 102B (and therefore the respective read/write heads 104A and 104B) towards the desired data track.

Figure 2:
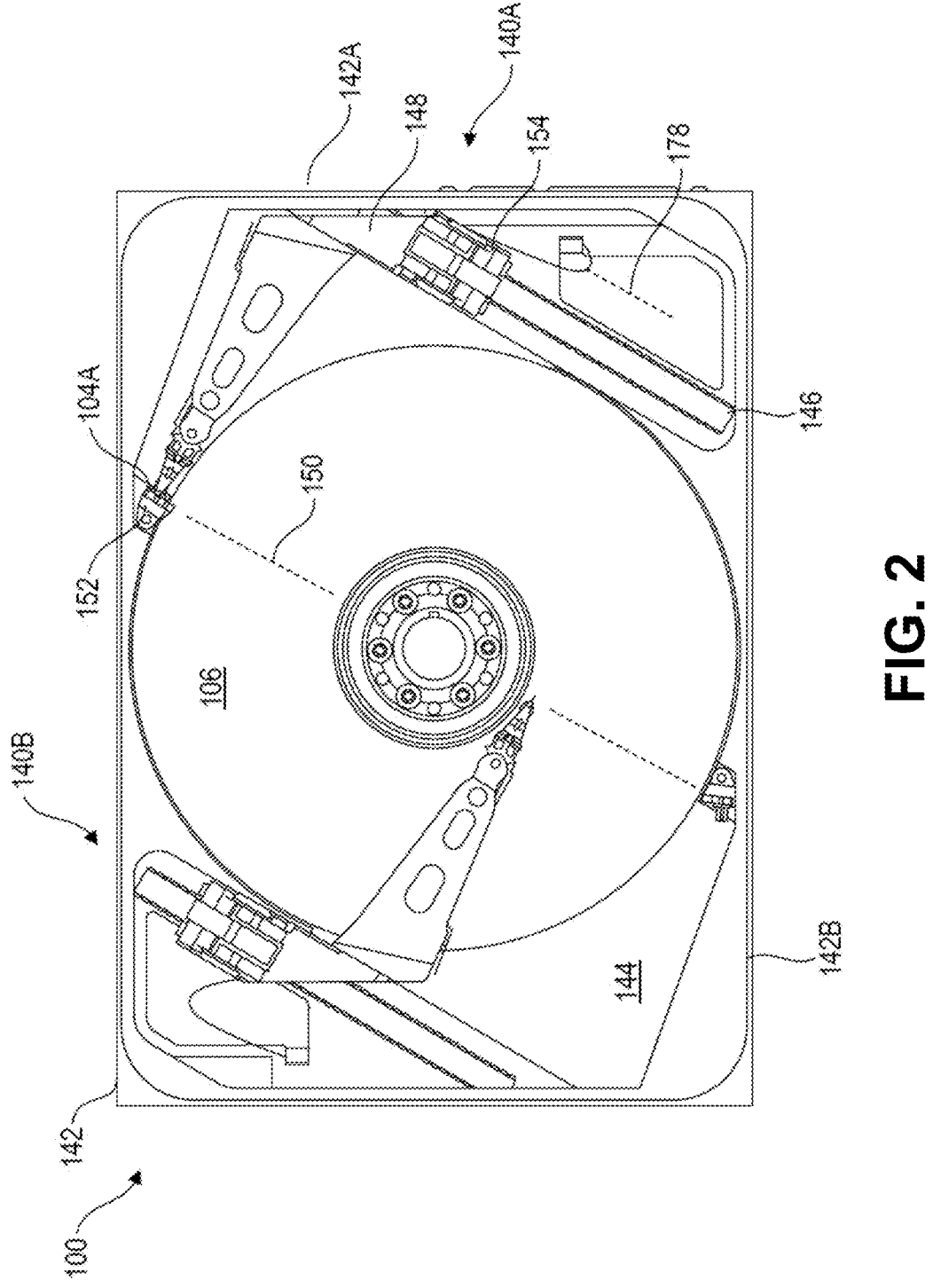
FIG. 2 shows a top view of the hard disk drive of FIG. 1, in accordance with certain embodiments of the present disclosure.

FIG. 2 shows a top view of the data storage device 100. The data storage device 100 includes sidewalls 142 around a periphery of the data storage device 100. The sidewalls 142 extend from a base 144, and the sidewalls 142 and the base 144 can be formed (e.g., cast, forged) as part of a single unit (e.g., an integrally formed unit). A top cover can be coupled (e.g., welded, fastened) to the sidewalls 142 to form a sealed enclosure (e.g., a hermetically sealed enclosure) in which various components of the data storage device are positioned.

For brevity and simplicity, the components of the actuator assemblies 140A and 140B are described below with respect to a single actuator assembly—the first actuator assembly 140A. The second actuator assembly 140B may include identical components as the first actuator assembly 140A, so the description below applies equally to both of the actuator assemblies 140A and 140B.

The actuator assembly 140A shown in FIG. 2 is configured to linearly move the read/write heads 104A (e.g., which each include respective magnetic sensors) to different positions with respect to the magnetic recording media 106. As such, the actuator assembly 140A can be considered to be a linear actuator assembly.

The actuator assembly 140A includes a stationary portion 146 and a movable portion 148. Together, the stationary portion 146 and the movable portion 148 can form a linear bearing. In certain embodiments, the stationary portion 146 is or includes a rail, and the movable portion 148 is or includes a carriage that is coupled to the stationary portion 146 such that the movable portion 148 can move with respect to the stationary portion 146.

As will be described in more detail below, the actuator assembly 140A includes a piezoelectric actuator that is configured and arranged to cause the movable portion 148 to move linearly between ends of the stationary portion 146—which ultimately causes movement of the read/write head 104A with respect to the magnetic recording medium 106. For example, the actuator assembly 140A can be arranged and configured such that movement of the movable portion 148 causes the read/write head 104A to move along a linear path 150 (represented with a dotted line). The linear path 150 can extend between an innermost data track (e.g., near an inner diameter of the magnetic recording medium 106) and an outermost data track (e.g., near an outer diameter of the magnetic recording medium 106). Further, the actuator assembly 140A can be arranged and configured such that movement of the movable portion 148 can cause the read/write head to move to a position adjacent a load/unload ramp 152. For example, a component such as a lift tab may be positioned at the distal end of the actuator assembly 140A, and the lift tab can rest on a portion of the load/unload ramp 152.

Figure 3:
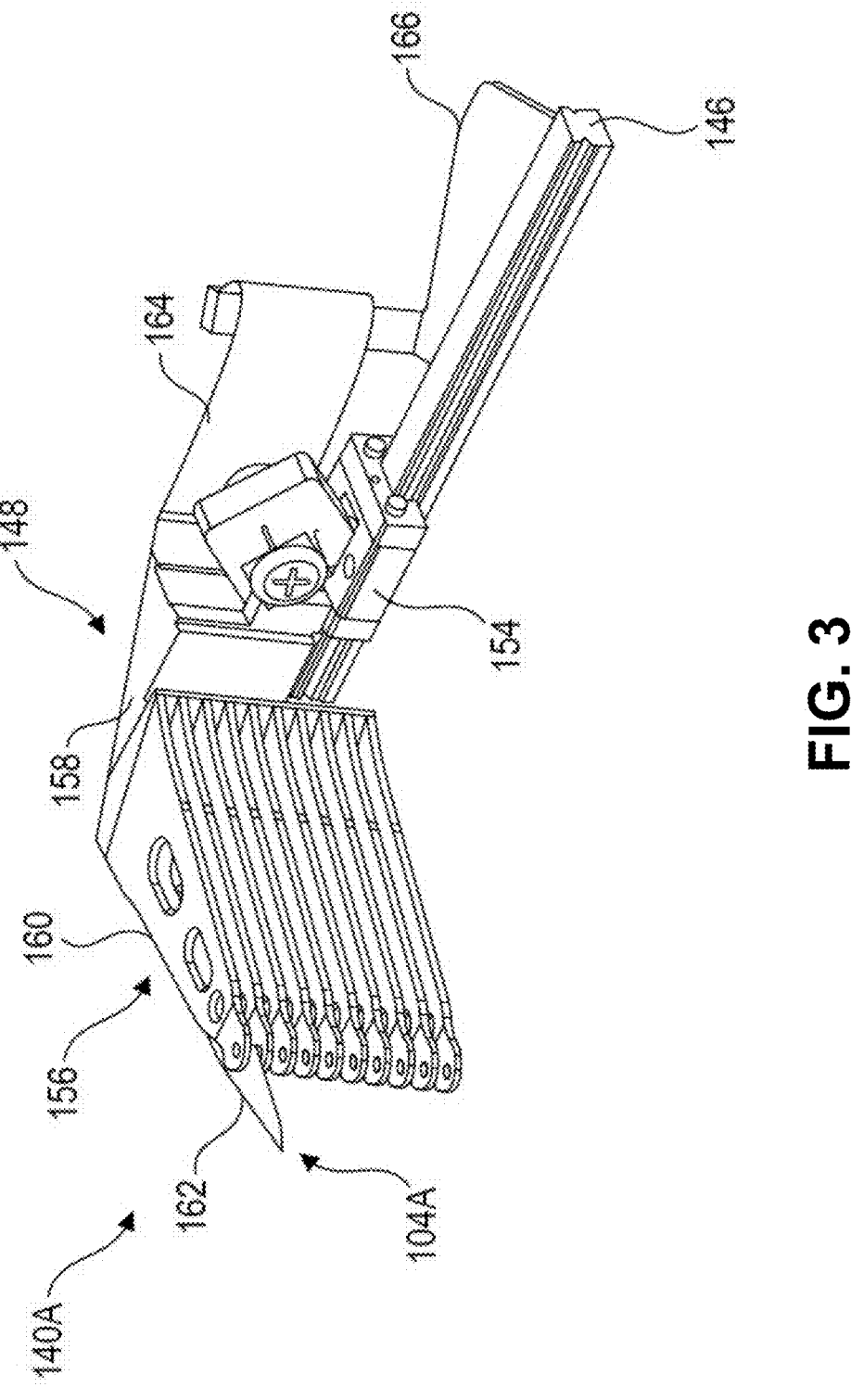
FIGS. 3-5 show different views of an actuator assembly, in accordance with certain embodiments of the present disclosure.

FIG. 3 shows additional details of the actuator assembly 140A. The moveable portion 148 can include a carriage portion 154, E-block portion 156, and a bridge portion 158 extending between the carriage portion 154 and the E-block portion 156. In certain embodiments, the E-block portion 156 and the bridge portion 158 form a single integral unit, but in other embodiments they are separate components that are made separately and then coupled together (e.g., fastened, welded, and the like). The E-block portion 156 and the bridge portion 158 can comprise a metal material (e.g., a metal comprising aluminum or steel (e.g., stainless steel). The E-block portion 156 can include arms 160 (e.g., one arm for each read/write head), and a suspension 162 (e.g., a component with a head-gimbal assembly (HGA)) can be coupled to each arm 160. FIG. 3 only shows one suspension and read/write head 104A but it should be appreciated that a respective suspension and read/write head would be coupled to each arm 160. For example, because the actuator assembly 140A in FIG. 3 is shown as having ten arms 160, the hard disk drive would include nine magnetic recording media. As such, a fully assembled dual actuator design would—in total—have twenty arms, thirty-six suspensions, and thirty-six read/write heads. It should be appreciated that a different number of arms, etc., can be used with features of the actuator assembly designs described herein.

The actuator assembly 140A includes a flexible circuit 164 that facilitates data and power transfer between the read/write heads and an electrical connector assembly 166. The electrical connector assembly 166 facilitates data and power transfer to and from components inside the enclosure of the hard disk drive to and from components exterior to the hard disk drive. In certain embodiments, one or more preamps are coupled to the electrical connector assembly 166 or the flexible circuit 164.

Figure 4:
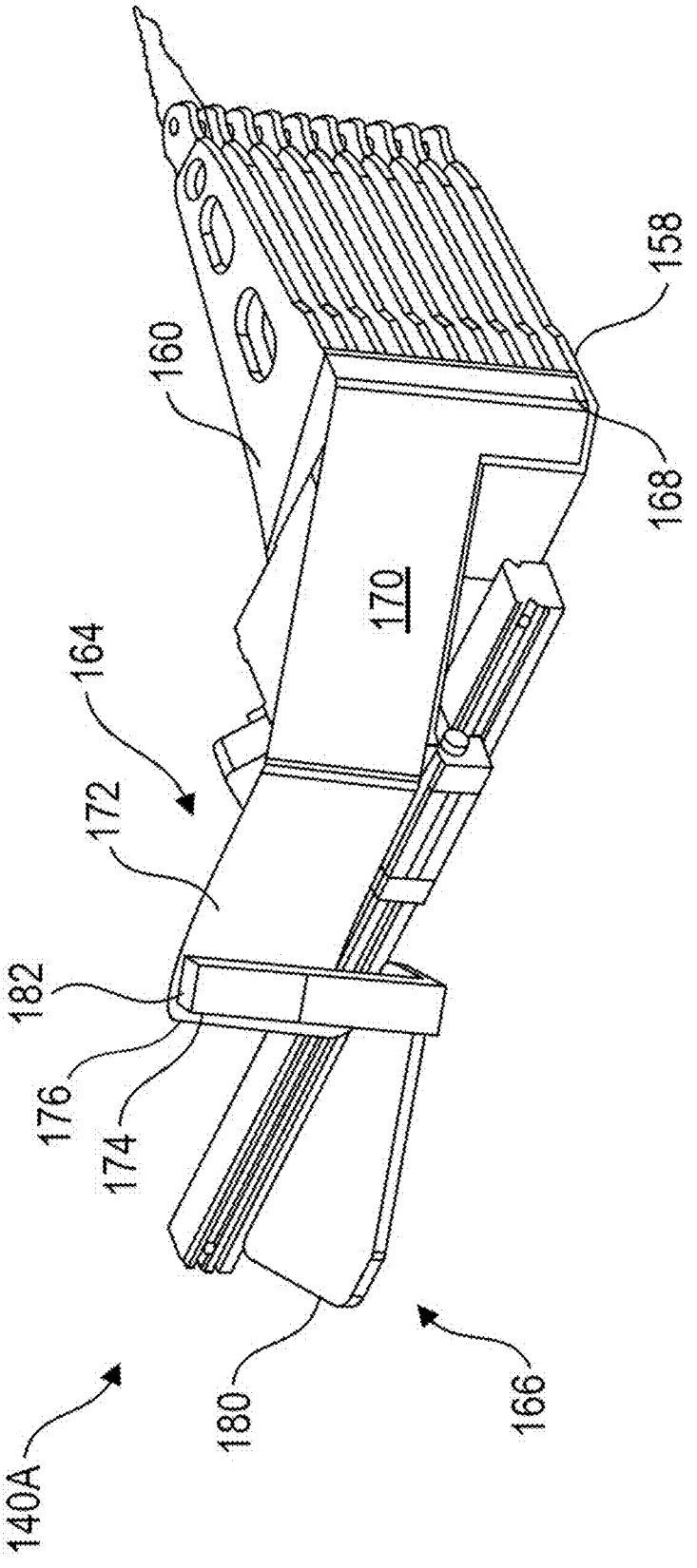

FIG. 4 shows a different view of the actuator assembly 140A. In the example of FIG. 4, the flexible circuit 164 includes multiple sections. A distal section 168 is attached to the E-block portion 156 and includes an electrical connector (e.g., a conductive portion such as a conductive bond pad) near the base of each arm 160. A wire or other type of conductive component can be mechanically and electrically coupled to each electrical connector so that data and power transfer can be facilitated between the read/write heads and the flexible circuit 164.

The flexible circuit 164 can also include a flat portion 170, a bending portion 172, and a proximal portion 174. The flat portion 170 is connected to the bridge portion 158, and the proximal portion is connected to the electrical connector assembly 166. In certain embodiments, the flexible circuit 164 includes a hinge section between the flat portion 170 and the bending portion 172. The hinge section allows the bending portion 172 to rotate relative to the flat portion 170.

The shape of the bending portion 172 will change as the movable portion 148 moves between ends of the stationary section 146. For example, when viewed from the top (as shown in FIG. 2), the profile of the bending portion 172 will change as the movable portion 148 moves between ends of the stationary section 146. When the movable portion 148 is closest to a first sidewall 142A (FIG. 2) and the read/write head 104A is near the outer diameter of the magnetic recording medium 106, the bending portion 172 forms a J-shape or candy-cane shape where a crest 176 (FIG. 4) or peak of the bending portion 172 is formed near the electrical connector assembly 166. When the movable portion 148 is closest to a second sidewall 142B (FIG. 2)—which is longer than the first sidewall 142A—and the read/write head 104A is near the inner diameter of the magnetic recording medium 106, the bending portion 172 forms a U-shape or V-shape where the crest 176 (FIG. 4) or peak of the bending portion 172 is formed further away from the first sidewall 142A. As the movable portion 148 moves towards the second sidewall 142B (FIG. 2), the crest 176 (FIG. 4) may follow a linear path 178 (represented by a dotted line).

Referring back to FIG. 4, the electrical connector assembly 166 includes a base portion 180 and a post 182. The base portion 180 is shaped to be coupled to the base 144 of the hard disk drive. The post 182 is mechanically coupled to the proximal portion 174 of the flexible circuit 164.

Figure 5:
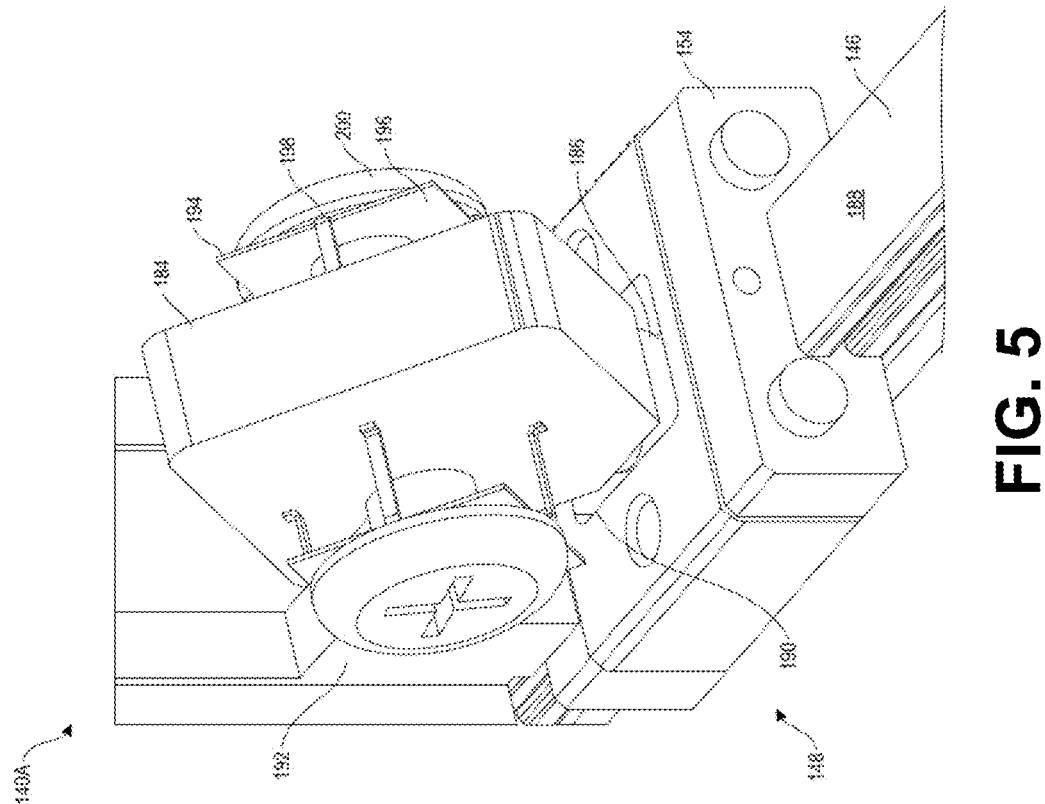

FIG. 5 shows a portion of the actuator assembly 140A, including certain features described above. The actuator assembly 140A includes a piezoelectric actuator 184. The piezoelectric actuator 184 can include a block of a piezo-electric material such as lead zirconate titanate (PZT) as well as electrodes (shown in a later Figure). When voltage is applied to the block of piezoelectric material—via the electrodes—the block will deform. The deformation can be controlled such that the piezoelectric actuator 184 contacts the stationary portion 146 and causes the movable portion 148 to move with respect to the stationary portion 146. For example, the piezoelectric actuator 184 can include a tip portion 186 that is shaped and arranged to contact the stationary portion 146 (e.g., a top surface 188) when voltage is applied to the block of piezoelectric material. During contact, the piezoelectric actuator 184 can be further deformed to cause the relative movement of the movable portion 148 and the stationary portion 146. In certain embodiments, the block of piezoelectric material and the tip portion 186 are made from different materials. In some embodiments, the tip portion 186 comprises a ceramic material.

In the example of FIG. 5, the tip portion 186 extends at least partially through an opening 190 of the carriage portion 154. The opening 190 allows the piezoelectric actuator 184—via the tip portion 186—to contact the stationary portion 146.

The piezoelectric actuator 184 is positioned between a pair of arms 192. In certain embodiments, the piezoelectric actuator 184 does not directly contact either of the arms 192 such that there is a gap between the piezoelectric actuator 184 and the arms 192. The piezoelectric actuator 184 can be indirectly coupled to the arms 192 via preloaded spring structures 194 on opposing sides of the piezoelectric actuator 184. In the example of FIG. 5, the two preloaded spring structures 194 each include a base 196 (e.g., a flat base) and multiple legs 198 extending from the base 196. Each base 196 can have a hole through which a fastener 200 extends. The fasteners 200 are respectively coupled (e.g., via a threaded connection) to the arms 192 to hold the respective bases 196 of the preloaded spring structures 194. The preloaded spring structures 194 (via the legs 198) apply opposing forces against the piezoelectric actuator 184 such that the piezoelectric actuator 184 is held in place without contacting the arms 192. With this arrangement, the piezo-electric actuator 184 is able to deform while still being positioned between the arms 192.

Figure 6:
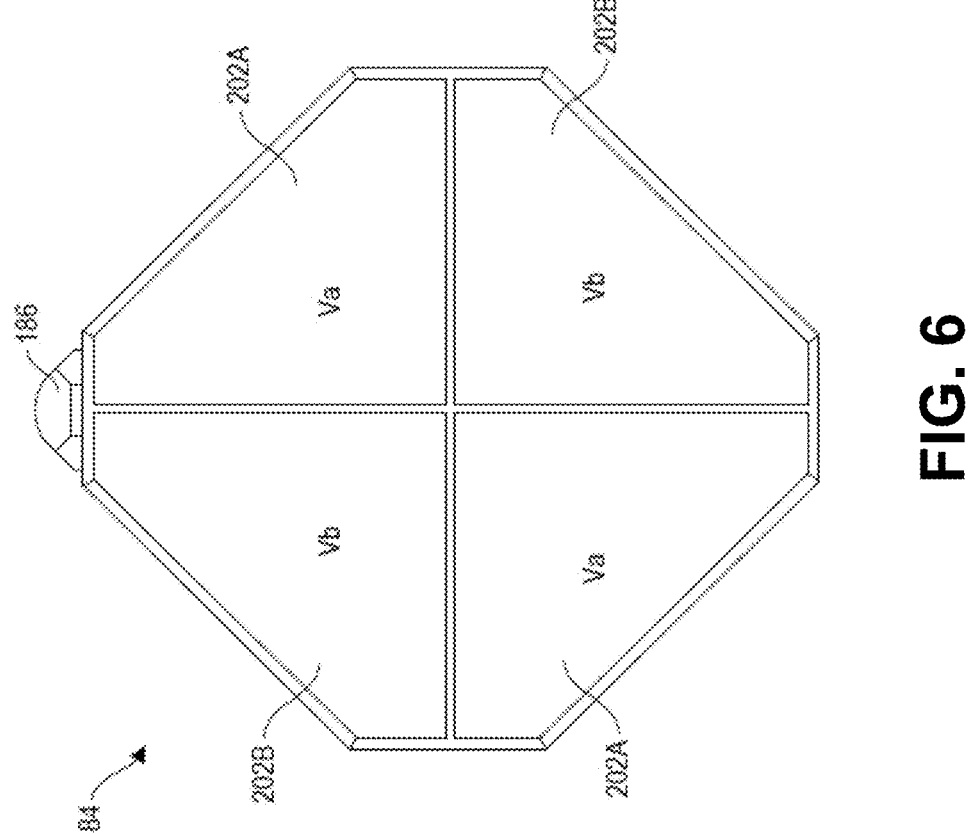
FIG. 6 shows the piezoelectric actuator with electrodes, in accordance with certain embodiments of the present disclosure.

FIG. 6 shows a schematic view of the piezoelectric actuator 184 and an example arrangement of electrodes 202A-B attached to the block of piezoelectric material. Only one side of the piezoelectric actuator 184 is shown in FIG. 6, but electrodes 202A-B can be positioned on both sides of the block of piezoelectric material in a similar arrangement (e.g., a mirror image) such that the piezoelectric actuator 184 includes a total of eight electrodes (e.g., four on one side of the block of piezoelectric material and four on the opposite side of the piezoelectric material). Although the block of piezoelectric material is shown as being a diamond shaped block, other shapes can be used with the piezoelectric actuator 184. For example, the block of piezoelectric material can have a circular shape with protrusions on four sides, a flattened rhombus shape, a kite shape, or a square or rectangular shape with protrusions along its four flat sides.

Each pair of electrodes can be positioned at opposing diagonal locations along the block of piezoelectric material. For example, one electrode can be positioned between 12 o'clock and 3 o'clock along a face of the block and its pair can be positioned between 6 o'clock and 9 o'clock (and the same arrangement of electrodes can be included on the opposite side of the block of piezoelectric material). The other pair can be positioned between 3 o'clock and 6 o'clock and between 9 o'clock and 12 o'clock (and the same arrangement of electrodes can be included on the opposite side of the block of piezoelectric material).

It has been found that a diamond shaped block of piezo-electric material has two normal deformation modes when an excitation voltage is applied to the block: a bending mode and an expanding mode. With the location of the electrodes 202A-B (e.g., diagonally opposed) and certain applied exci-tation voltages (e.g., at a 90-degree phase difference), defor-mation of the block of piezoelectric material can be con-trolled such that the piezoelectric actuator causes the movable portion of the actuator assembly to move relative to the stationary portion. In particular, the excitation voltages can be controlled to cause the tip portion 186 to move in an elliptical motion. Such a motion can be used to cause the tip portion 186 to contact the stationary portion and move the movable portion of the actuator assembly between ends of the stationary portion. In certain embodiments, a wire is electrically coupled to each electrode to supply the voltage applied to the block of piezoelectric material.

For the electrodes shown in FIG. 6, one pair of electrodes (denoted by Va and reference number 202A) can apply an excitation voltage at a first phase to cause the piezoelectric material to deform while the other pair of electrodes (denoted by Vb and reference number 202B) can apply an excitation voltage at a second phase that has a 90-degree phase difference from the first phase. The 90-degree phase difference can be accomplished by using a sine wave for one pair of electrodes and a cosine wave for the other pair of electrodes. It has been found that applying an excitation positive voltage in a poling direction of the piezoelectric material causes the piezoelectric material to elongate along a polar axis of the material and contract in transverse direction, whereas applying an excitation positive voltage in a depoling direction of the piezoelectric material causes the piezoelectric material to contract along the polar axis and elongate in the transverse direction.

Figures 7A, 7B:
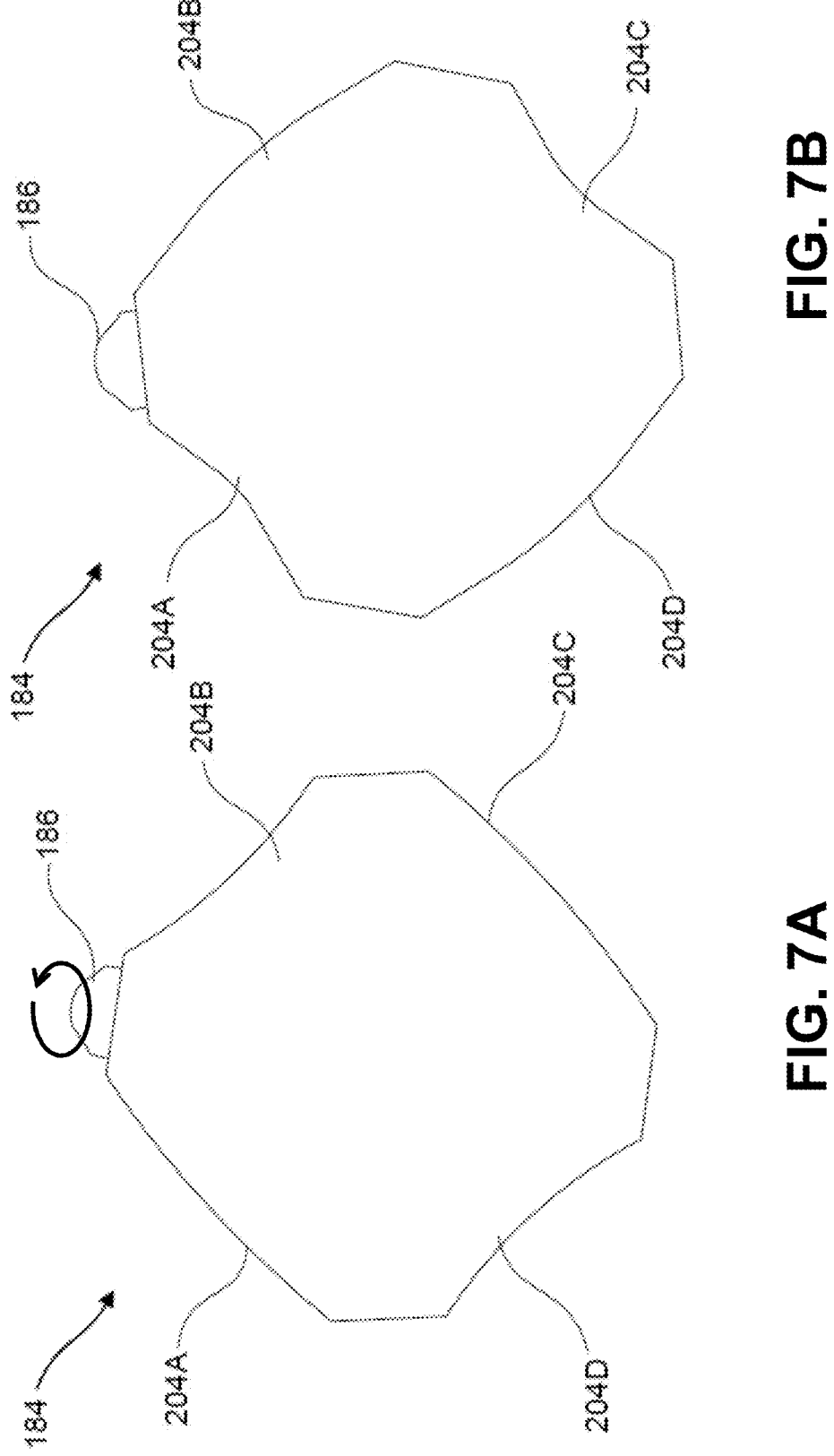
FIGS. 7A and 7B show how a piezoelectric actuator can be controlled to form different shapes, in accordance with certain embodiments of the present disclosure.

FIGS. 7A and 7B show the piezoelectric actuator 184 (e.g., the block of piezoelectric material and the tip portion 186) at different deformation states along an elliptical-shaped stroke of the piezoelectric actuator 184. The piezoelectric actuator 184 is shown as having a diamond shape with curved or chamfered tips. Each side 204A-D of the diamond shaped piezoelectric actuator 184 is substantially flat or linear in an undeformed state (e.g., the state shown in FIGS. 5 and 6). But when excitation voltages are applied to the piezoelectric actuator 184 (e.g., via electrodes), the piezoelectric actuator 184 will deform.

In FIG. 7A, one pair of sides 204A and 204C are deformed to form a convex shape/side profile while the other pair of sides 204B and 204D are deformed to form a concave shape/side profile. As such, the length between the concave sides 204B and 204D is less than the length between the convex sides 204A and 204C. In this deformation state, the tip portion 186 is moved towards the closest concave side 204B.

In FIG. 7B, the excitation voltages applied to the piezoelectric actuator 184 have changed such that the shapes of the pair of sides have switched from the deformation state shown in FIG. 7A. In the deformation state in FIG. 7B, the tip portion 186 is moved towards the closest concave side 204A. By cycling through these two deformation states (e.g., at ultrasonic frequencies), the piezoelectric actuator 184 can be controlled to move the movable portion of the actuator assembly back and forth along the stationary portion. This movement moves the E-block and read/write heads to different data tracks on the magnetic recording medium to record and/or access data.

The actuator assemblies 140A and 140B described herein provide benefits compared to traditional voice coil motors such as a smaller footprint, less power consumption, less heat generation, less mass, easier assembly, and less use of rare earth materials (e.g., neodymium magnets). The actuator assemblies 140A and 140B are structured and arranged to move read/write heads along a linear path as opposed to a curved path with traditional voice coil motors. The read/write heads can be arranged such that there is a fixed and/or zero skew between the reader and writer with respect to a data track on the magnetic recording medium. As such, the read/write head may be able to read data immediately after writing the data.

Figure 8:
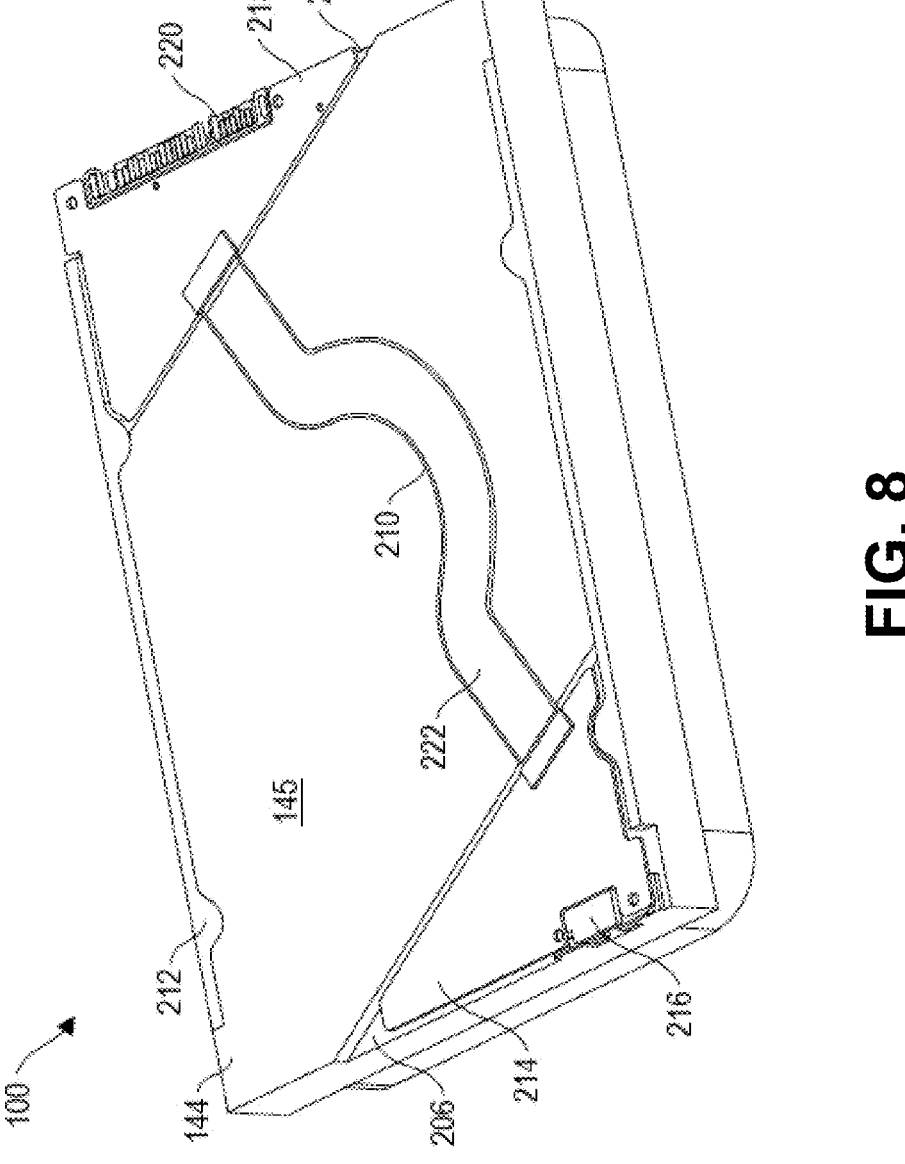
FIG. 8 shows a perspective view of a bottom side of the hard disk drive of FIG. 2, in accordance with certain embodiments of the present disclosure.

FIG. 8 shows a bottom perspective view of the data storage device 100. As noted above, one part of the enclosure of the data storage device 100 is the base 144. The base 144 in FIG. 8 has a bottom surface 145 that is shaped to accommodate various components of the data storage device 100. For example, the bottom surface 145 has a first reduced thickness section 206, a second reduced thickness section 208, and a channel (or third reduced thickness section) 210 that extends between the first and second reduced thickness section 206 and 208. The bottom surface 145 also includes various raised or increased thickness sections 212 (e.g., datum surfaces) along the sides (e.g., longer sides) of the base 144.

The first reduced thickness section 206 is shaped to accommodate a first printed circuit board 214 (e.g., a rigid or flexible printed circuit). The first printed circuit board 214 facilitates data and power transfer to one or both of the two actuator assemblies. In certain embodiments, the first printed circuit board 214 includes a serial port 216 to facilitate data and power transfer to a device or system (e.g., a test system, a server, a computer, and the like) that is external to the data storage device 100.

The second reduced thickness section 208 is shaped to accommodate a second printed circuit board 218 (e.g., a rigid or flexible printed circuit). The second printed circuit board 218 facilitates data and power transfer to one or both of the two actuator assemblies. In certain embodiments, the second printed circuit board 218 includes a serial advanced technology attachment (SATA) connector 220 to facilitate data and power transfer to a device or system external to the data storage device 100.

A flexible circuit 222 is mechanically and electrically coupled between the first and second printed circuit boards 214 and 218. The channel 210 is shaped to accommodate the flexible circuit 222.

Various modifications and additions can be made to the embodiments disclosed without departing from the scope of this disclosure. For example, while the embodiments described above refer to particular features, the scope of this disclosure also includes embodiments having different combinations of features and embodiments that do not include all of the described features. Accordingly, the scope of the present disclosure is intended to include all such alternatives, modifications, and variations as falling within the scope of the claims, together with all equivalents thereof.

We claim:

1. An apparatus comprising:
a linear actuator assembly comprising a rail, a carriage, and a piezoelectric actuator,
wherein the carriage is coupled to the rail such that the carriage is movable with respect to the rail,
wherein the piezoelectric actuator is configured and arranged to cause the carriage to move linearly between ends of the rail,
wherein the piezoelectric actuator is positioned between a pair of arms, wherein the piezoelectric actuator is indirectly coupled to the pair of arms via a first preloaded spring structure.

2. The apparatus of claim 1, wherein the carriage includes an opening, wherein a tip of the piezoelectric actuator extends at least partially through the opening.

3. The apparatus of claim 1, wherein a ceramic tip of the piezoelectric actuator is arranged to contact the rail to effect movement of the carriage.

4. The apparatus of claim 1, wherein the piezoelectric actuator is indirectly coupled to the pair of arms via the first preloaded spring structure and a second preloaded spring structure, wherein the first preloaded spring structure is coupled to one of the pair of arms via a first fastener, wherein the second preloaded spring structure is coupled to one of the pair of arms via a second fastener.

5. A hard disk drive comprising:
a magnetic recording medium;
a first magnetic sensor; and
a first actuator assembly configured to linearly move the
first magnetic sensor to different positions with respect
to the magnetic recording medium, the first actuator
assembly comprises:
a first linear bearing with a first movable portion and a
first stationary portion, and
a first piezoelectric actuator configured to move the first
movable portion to cause movement of the first
magnetic sensor, wherein the piezoelectric actuator
is positioned between a pair of arms, wherein the
piezoelectric actuator is indirectly coupled to the pair
of arms via a first preloaded spring structure.
6. The hard disk drive of claim 5, further comprising:
a second magnetic sensor; and
a second actuator assembly configured to linearly move
the second magnetic sensor to different positions with
respect to the magnetic recording medium, the second
actuator assembly comprises:
a second linear bearing with a second movable portion
and a second stationary portion, and
a second piezoelectric actuator configured to move the
second movable portion to cause movement of the
second magnetic sensor.
7. The hard disk drive of claim 5, wherein the first
movable portion includes a carriage, wherein the first sta-
tionary portion is a rail.
8. The hard disk drive of claim 5, wherein the first
movable portion includes an opening, wherein a tip portion
of the first piezoelectric actuator extends at least partially
through the opening.
9. The hard disk drive of claim 8, wherein the tip portion
comprises a ceramic material.
10. The hard disk drive of claim 5, wherein a tip portion
of the first piezoelectric actuator is arranged to contact the
first stationary portion.
11. The hard disk drive of claim 10, wherein the tip
portion and a remaining portion of the first piezoelectric
actuator comprise different materials.
12. The hard disk drive of claim 5, wherein the first
preloaded spring structure is coupled to one of the pair of
arms.
13. The hard disk drive of claim 5, wherein the piezo-
electric actuator is indirectly coupled to the pair of arms via the first preloaded spring structure and a second preloaded
spring structure, wherein the first preloaded spring structure
is coupled to one of the pair of arms via a first fastener,
wherein the second preloaded spring structure is coupled to
one of the pair of arms via a second fastener.
14. The hard disk drive of claim 5, further comprising a
serial port on one side of an enclosure of the hard disk drive,
and a serial advanced technology attachment (SATA) con-
nector on another side of the enclosure.
15. The hard disk drive of claim 14, further comprising a
flexible circuit electrically connected between the serial port
and the SATA connector.
16. The hard disk drive of claim 5, further comprising a
controller, wherein the controller is configured to cause
voltages to be applied to the first piezoelectric actuator to
deform the first piezoelectric actuator such that a tip portion
moves along an elliptical path.
17. The hard disk drive of claim 5, further comprising a
controller, wherein the controller is configured to cause
voltages to be applied to the first piezoelectric actuator to
deform the first piezoelectric actuator such that two sides of
the first piezoelectric actuator form a concave shape and
another two sides of the first piezoelectric actuator form a
convex shape.
18. The hard disk drive of claim 5, wherein the movable
portion includes or is coupled to an E-block.
19. A hard disk drive comprising:
a magnetic recording medium;
a magnetic sensor;
an actuator assembly configured to linearly move the
magnetic sensor to different positions with respect to
the magnetic recording medium, wherein the actuator
assembly comprises:
a linear bearing with a movable portion and a stationary
portion, and
a piezoelectric actuator configured to move the mov-
able portion to cause movement of the magnetic
sensor; and
a controller configured to cause voltages to be applied to
the piezoelectric actuator to deform the piezoelectric
actuator such that two sides of the piezoelectric actua-
tor form a concave shape and another two sides of the
piezoelectric actuator form a convex shape.

* * * * *